United States Patent [19]

Patterson

[11] Patent Number: 5,177,897
[45] Date of Patent: Jan. 12, 1993

[54] GAS DISPENSING AND COLLECTING APPARATUS

[76] Inventor: James A. Patterson, 2074 20th St., Sarasota, Fla. 34236

[21] Appl. No.: 563,034

[22] Filed: Aug. 6, 1990

[51] Int. Cl.$^5$ .................................... A01C 00/00
[52] U.S. Cl. .............................. 47/48.5; 47/1.01
[58] Field of Search ............. 47/48.5, 81, 1.01, 58

[56] References Cited

U.S. PATENT DOCUMENTS

| | | | |
|---|---|---|---|
| 4,805,343 | 2/1989 | Patterson et al. | 47/48.5 |
| 4,928,427 | 5/1990 | Patterson | 47/81 |
| 4,995,190 | 2/1991 | Royer | 47/48.5 |
| 5,081,790 | 1/1992 | Hinton | 47/81 |

*Primary Examiner*—David A. Scherbel
*Assistant Examiner*—Joanne C. Downs
*Attorney, Agent, or Firm*—Charles J. Prescott

[57] ABSTRACT

An elongated tube having a tube wall permeable to a gas and impermeable to a liquid is used to transfer a gas from one side of the tube wall to the other. For some purposes, such as fertilization, anhydrous ammonia is introduced into such a tube with the tube being disposed in soil at or below root level of the plants. The amount of ammonia dispensed through the tube wall is a function of the pressure of the ammonia. The ammonia may also be carried in the tube using water in which it is dissolved forming ammonium hydroxide. The same type of tube when disposed above a fermenting aqueous sugar in a fermentation vat will collect carbon dioxide resulting in enhanced fermentation. The tube may be connected to an exhaust fan. The same type of tube may be disposed in a sanitary land fill with water circulating through the tube to collect water gas formed by the decomposition of the waste material.

14 Claims, 2 Drawing Sheets

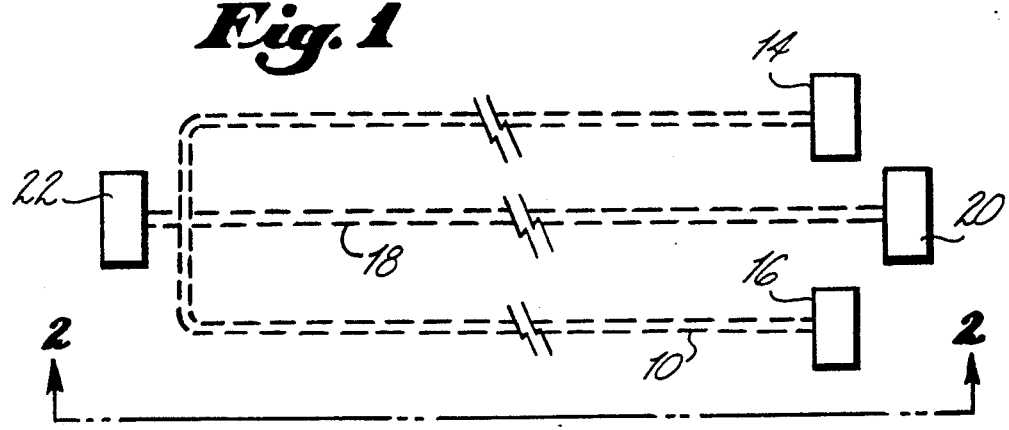
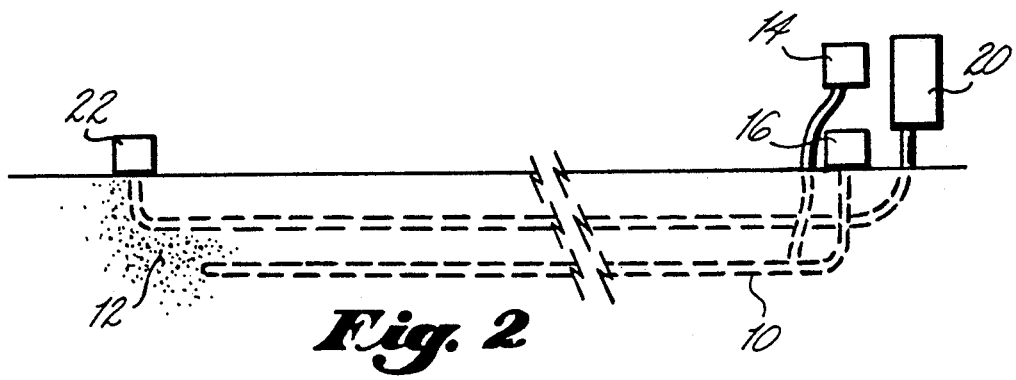
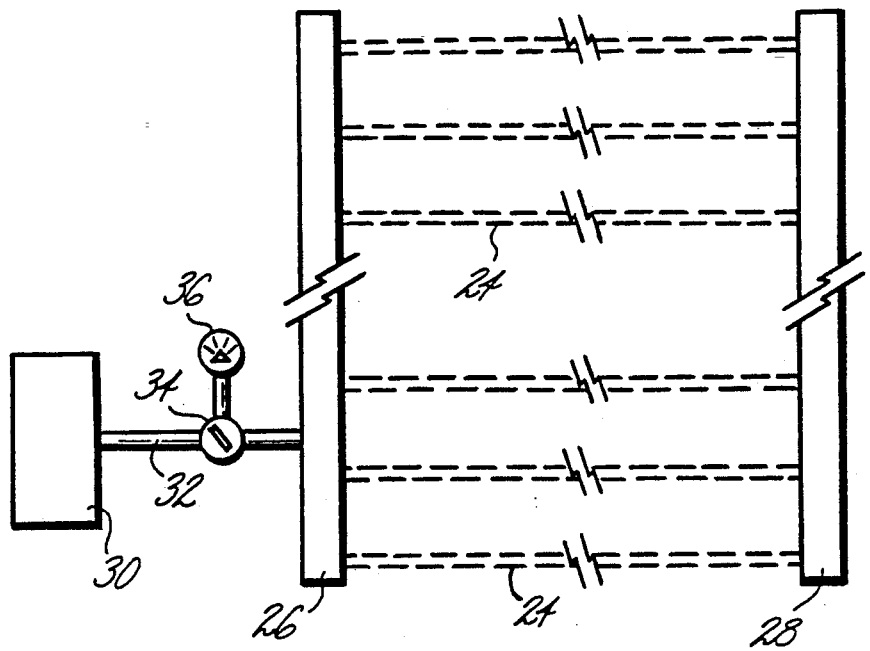

GAS DISPENSING AND COLLECTING APPARATUS

BACKGROUND OF THE INVENTION

1. Field of the Invention

This invention relates generally to apparatus with which gas can be dispensed at a controlled rate into a desired medium, and with which gas can be collected from a medium.

1. Description of Related Art

Nitrogen is a recognized necessary nutrient for plant growth. The rocks and soils of the earth contain very little combined nitrogen so that fertilizers containing nitrogen compounds are typically used to aid plant growth. The nitrogen in many of these fertilizers is in the form of nitrates. An unfortunate side effect from the use of such fertilizers is the pollution of the ground water.

The use of aqueous ammonia as a fertilizer is also known. In my U.S. Pat. No. 4,928,427 entitled "Irrigation System", I suggest the dispensing of aqueous ammonia in conjunction with irrigation of plants using coils of hollow cellulose acetate tubing having walls permeable to water. I have now found that gaseous ammonia can also be effectively dispensed for fertilizing purposes.

The fermentation of sugars or starches to produce ethyl alcohol has, as a by-product, the production of carbon dioxide. This fermentation usually is performed in a closed container and the increasing partial pressure of the carbon dioxide above the liquid tends to impede the fermentation. I have found that this carbon dioxide can be collected and removed so as to enhance the rate of fermentation.

It is known that land fills produce combustible gas mixtures which I will herein call water gas. I have found that such gases can be collected and removed for use as fuel or the like.

SUMMARY OF THE INVENTION

In the dispensing of ammonia gas for fertilizing, hollow cellulose acetate tubing having a wall permeable to gas, but impermeable to liquid is disposed in the soil in the proximity of the plants to be fertilized. For example, the tube may be disposed in the ground under a row of corn to be planted. Gaseous ammonia under pressure is introduced into the tube and permeates through the tube wall to fertilize the corn. The rate of fertilization increases with increasing pressure. If there is water in the soil, the ammonia may combine with it to form ammonium hydroxide, or water can be separately provided. Aqueous ammonia, i.e. ammonia dissolved in water, may also be used to provide the ammonia by introducing it into one end of the tube at a pressure sufficient to cause the ammonia to permeate through the tube wall at a desired rate. The water, which serves to transport the ammonia, is removed at the other end of the tube to be enriched with additional ammonia and recirculated.

In the collection of carbon dioxide from a fermentation vat, a similar tube is disposed above the liquid in the vat, and water is circulated through the tube from one end to the other. The carbon dioxide passes through the wall of the tube into the water forming carbonic acid. This acid is removed at the other end of the tube.

In the collection of water gas, a similar tube is disposed in the land fill with one end supplied with water. The water gas passes through the wall of the tube into the water and is removed at the other end of the tube. As the land fill receives sufficient material, additional tubes are disposed to operate in the same manner.

It is therefore an object of this invention to provide gas dispensing and collection apparatus employing hollow cellulose acetate tubes having walls permeable to gas but impermeable to liquid by passing gas through the tube wall from and/or to a liquid.

It is also an object of this invention to provide apparatus for dispensing gaseous ammonia for fertilizing.

It is also an object of this invention to provide apparatus for collecting carbon dioxide from a fermentation vat.

It is a further object of this invention to provide apparatus for collecting water gas from a land fill.

In accordance with these and other objects, which will become apparent hereafter, the instant invention will now be described with reference to the accompanying drawings.

BRIEF DESCRIPTION OF THE DRAWINGS

FIG. 1 is a plan view of tubing disposed for fertilization in accordance with the invention.

FIG. 2 is a cross-section of FIG. 1 taken on the line 2—2.

FIG. 3 is a plan view of an alternate arrangement of tubing disposed for fertilization in accordance with the invention.

DETAILED DESCRIPTION OF THE INVENTION

Figure 4:
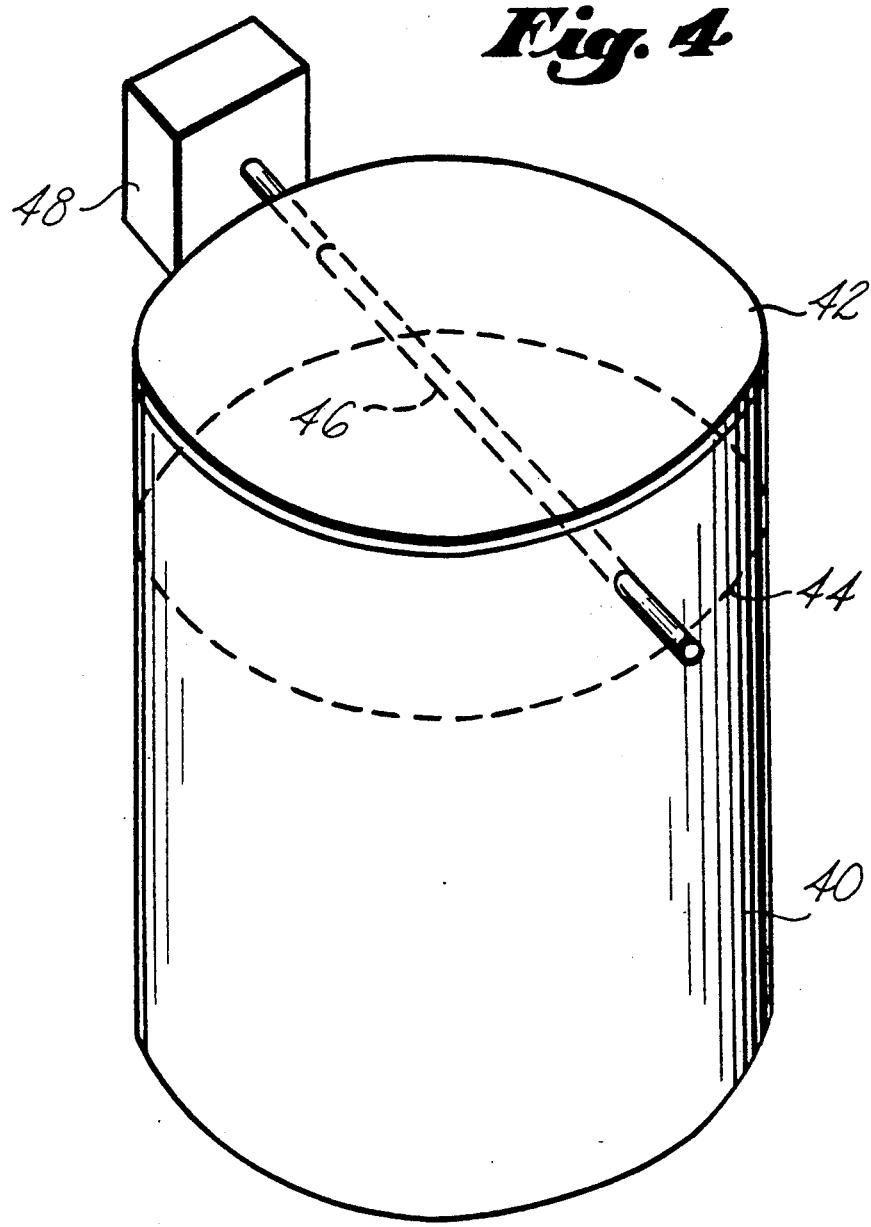
FIG. 4 is a perspective view of a fermentation vat containing tubing for the removal of carbon dioxide.

Referring to FIGS. 1 and 2, elongated hollow tube 10 has a tube wall which is permeable to a gas, but impermeable to a liquid. Tube 10 may be formed of cellulose acetate. Tube 10 is disposed below the surface of soil 12 along a line which is to be sowed with a desired type of plant seed—say corn. Tube 10 is disposed at a depth which is preferably somewhat deeper than the roots of the plant will grow. A first container 14 is supplied with water in which ammonia has been dissolved. As is well known, ammonium hydroxide is formed when this is done; however, more or less ammonia than the amount necessary to form ammonium hydroxide may be dissolved in the water. For the purposes of this invention, the resulting liquid will be termed aqueous ammonia. Container 14 is elevated so that the aqueous ammonia will flow from container 14, through tube 10 to container 16 which initially is empty and is at a lower elevation. As the aqueous ammonia circulates through tube 10 from container 14 to container 16, gaseous ammonia will pass through the walls of tube 10 into the ambient soil. If there is water in the ambient soil, some of this ammonia will dissolve into this water. As the plants develop roots, the water containing the ammonia will pass into these roots providing a needed nutrient—nitrogen. When container 14 becomes empty, the water in container 16 can be refortified with nitrogen and elevated while container 10 is lowered to reverse the flow. Although tube 10 is impermeable to liquid, water vapor can pass through the tube wall. Cellulose acetate tubes suitable for use can be made in the manner described in U.S. Pat. No. 3,423,491. If additional water is needed, a separate water carrying hollow tube 18 fed by supply tank 20 can be utilized. Tube 18 can be connected to receiver tank 22. Tube 18 may be water permeable if desired. Such water permeable tubes are described in U.S. Pat. No. 4,805,343.

It should be recognized that this method of providing nitrogen to plants is efficacious for several reasons: the nitrogen is provided in a form which is not detrimental to the ground water such as fertilizers containing nitrates, the nitrogen is provided at precisely the desired location and the nitrogen is provided in a quantity which can be controlled.

Turning next to FIG. 3 an alternate arrangement for supplying nitrogen to plants will be described. A number of gas permeable tubes 24 are disposed generally parallel in the soil at a desired depth. Tubes 24 are connected at one end to feed manifold 26 and at the other to terminal manifold 28. Manifolds 26 and 28 need not be buried. Tank 30 contains pressurized anhydrous ammonia and is connected to manifold 26 by pipe 32. Pressure reducing valve 34 permits adjustment of the pressure of the ammonia delivered to manifold 26 and pressure gauge 36 provides a visible indication of this pressure. Increasing the pressure in the array of tubes 24, increases the quantity of ammonia dispensed to the plants.

Referring to FIG. 4, tank 40 having hermetically sealed top 42 contains a fermenting aqueous solution of sugar the upper surface of which is indicated by broken line 44. In accordance with the invention, tube 46, which is permeable to gas, but impermeable to liquid is disposed above the surface of the fermenting mixture. This space may contain a medium such as water vapor, but also contains carbon dioxide which is produced as a by-product of the fermentation. Tube 46 is closed at one end and is connected to exhaust fan 48 at the other end. Carbon dioxide will permeate into tube 46 as the partial pressure of the carbon dioxide outside tube 46 is higher than that inside tube 46, due to the removal of the carbon dioxide by fan 48. Removal of the carbon dioxide from above the fermenting mixture enhances the rate of fermentation. Tube 46 may be increased a desired amount by coiling.

Figure 5:
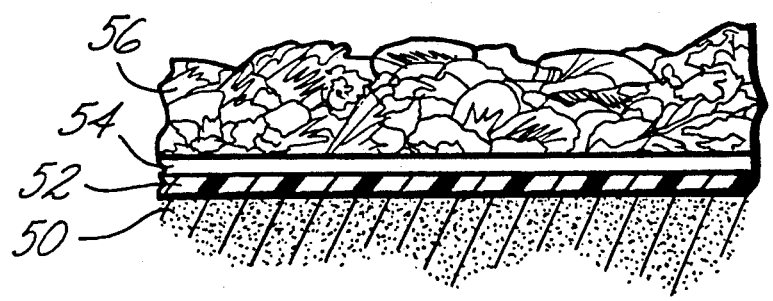
FIG. 5 is a detail of a sanitary land fill with tubing disposed for the removal of water gas.

Turning to FIG. 5, a detail of the bottom portion of a sanitary land fill is represented. Covering ground 50 is waterproof barrier 52 which may be any suitable material. Extending through the land fill is tube 54 which is permeable to a gas, but impermeable to liquid. Above and on the sides of tube 54 is garbage 56. Tube 54 is extended completely across the landfill and preferably contains circulating water to prevent collapse. Tube 54 may be disposed in the manner shown in FIG. 3—connected at one end to a feed manifold and at the other end to a terminal manifold. The decomposition of garbage results in the production of a mixture of gases—herein designated water gas and liquid. The water gas permeates through the wall of tube 54 and dissolves in the water therein. It is carried to an extraction point, such as the terminal manifold where it is removed for use as a fuel or burned off.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

I claim:

1. Apparatus for transferring a gas from a first medium to a second medium comprising:
    an elongated hollow tube having a tube wall permeable to a gas and impermeable to a liquid;
    said tube being disposed with a gas in a first medium on one side of said wall and a second medium on the other side of said wall.

2. Apparatus in accordance with claim 1 wherein:
    said gas is contained in a liquid inside said hollow tube, whereby said gas can pass through said tube wall leaving said liquid within said tube.

3. Apparatus in accordance with claim 1 wherein:
    said gas is contained in a liquid outside said hollow tube, whereby said gas can pass through said tube wall leaving said liquid outside said tube.

4. Apparatus in accordance with claim 1 wherein:
    said hollow tube contains circulating water.

5. Apparatus in accordance with claim 1 wherein:
    said hollow tube is disposed in soil to be fertilized;
    said hollow tube contains circulating aqueous ammonia.

6. Apparatus in accordance with claim 1 wherein:
    said hollow tube is formed of cellulose acetate.

7. Apparatus as set forth in claim 1, structured for providing nitrogen as fertilizer in the form of ammonia to plants in soil further comprising:
    supply means for supplying ammonia to said tube;
    said tube being disposed in the soil to be planted at a depth at or below plant root depth.

8. Apparatus for providing nitrogen as fertilizer in the form of ammonia to plants in soil in accordance with claim 7 wherein:
    said ammonia is anhydrous; and
    said apparatus includes pressure regulating means for maintaining ammonia pressure at a desired level.

9. Apparatus for providing nitrogen as fertilizer in the form of ammonia to plants in soil in accordance with claim 1, further comprising:
    a feed manifold connected to said pressure regulating means for receiving said anhydrous ammonia;
    a terminal manifold;
    said elongated hollow tube being one of a plurality of elongated hollow tubes having a first end connected to said feed manifold and a second end connected to said terminal manifold.

10. Apparatus for providing nitrogen as fertilizer in the form of ammonia to plants in soil in accordance with claim 7, wherein:
    said ammonia is dissolved in water.

11. Apparatus for providing nitrogen as fertilizer in the form of ammonia to plants in soil in accordance with claim 7, further comprising:
    an elongated hollow tube having a tube wall permeable to a liquid disposed in the soil generally parallel to said tube impermeable to a liquid.

12. Apparatus as set forth in claim 1 structured for removing carbon dioxide from a vat for producing ethyl alcohol by fermentation of an aqueous solution of sugar contained in the vat lower portion further comprising:
    means connected to said tube portion external to the vat for removing carbon dioxide therefrom;
    said tube being disposed in the vat upper portion and having a portion external to the vat.

13. Apparatus for removing carbon dioxide from the vat in accordance with claim 12, wherein:
    said tube contains circulating water.

14. Apparatus as set forth in claim 1 structured for removing water gas from a sanitary landfill further comprising:
    means for circulating water through said tube;
    said tube being disposed in the sanitary landfill.

* * * * *